United States Patent
Schleicher et al.

(10) Patent No.: US 10,524,407 B2
(45) Date of Patent: Jan. 7, 2020

(54) CROP ROW SENSING ON VEHICLE WITH MULTIPLE, INDEPENDENTLY STEERABLE AXLES/WHEELS

(71) Applicant: Deere & Company, Moline, IL (US)

(72) Inventors: Tyler D. Schleicher, Urbandale, IA (US); David L. Mulder, Ankeny, IA (US); Noah J. Rasmussen, Urbandale, IA (US)

(73) Assignee: Deere & Company, Moline, IL (US)

( * ) Notice: Subject to any disclaimer, the term of this patent is extended or adjusted under 35 U.S.C. 154(b) by 63 days.

(21) Appl. No.: 15/639,794

(22) Filed: Jun. 30, 2017

(65) Prior Publication Data

US 2019/0000007 A1     Jan. 3, 2019

(51) Int. Cl.
| | |
|---|---|
| *A01B 69/04* | (2006.01) |
| *B62D 15/02* | (2006.01) |
| *B62D 6/00* | (2006.01) |
| *A01B 69/00* | (2006.01) |

(52) U.S. Cl.
CPC .......... *A01B 69/008* (2013.01); *A01B 69/001* (2013.01); *B62D 6/005* (2013.01); *B62D 15/024* (2013.01)

(58) Field of Classification Search
CPC .............................. A01B 69/008; B62D 6/005
See application file for complete search history.

(56) References Cited

U.S. PATENT DOCUMENTS

| | | | |
|---|---|---|---|
| 4,528,804 A | 7/1985 | Williams | |
| 4,573,547 A | 3/1986 | Yoshimura | |
| 4,663,918 A | 5/1987 | Williams | |
| 5,010,719 A * | 4/1991 | Korthuis | A01D 46/28 180/401 |
| 5,079,706 A | 1/1992 | Yamaguchi | |
| 5,410,479 A * | 4/1995 | Coker | G05D 1/0255 180/168 |
| 9,485,914 B2 | 11/2016 | Schleicher | |
| 9,565,802 B2 | 2/2017 | Schleicher | |
| 2002/0106108 A1* | 8/2002 | Benson | A01B 69/001 382/104 |
| 2005/0252190 A1* | 11/2005 | Scott | A01D 46/264 56/340.1 |

(Continued)

FOREIGN PATENT DOCUMENTS

| | | |
|---|---|---|
| EP | 1688027 A1 | 8/2006 |
| EP | 3033933 A1 | 6/2016 |
| EP | 3090922 A1 | 9/2016 |

OTHER PUBLICATIONS

U.S. Appl. No. 14/967,821, filed Dec. 14, 2015 entitled "Tactile Guidance Arrangement for Vehicles" 46 pages.
Extended EP Search Report dated Dec. 11, 2018, 7 pages.

*Primary Examiner* — Jess Whittington
(74) *Attorney, Agent, or Firm* — Christopher J. Volkmann; Kelly, Holt & Christenson, PLLC

(57) ABSTRACT

An agricultural machine has a set of front wheels and a set of rear wheels that are independently steerable relative to one another. Distance sensors are mounted to the agricultural vehicle to sense a distance between the front wheels, and the adjacent row crops, and between the rear wheels, and the adjacent row crops. Automatic steering control signals are generated to automatically steer the front wheels, and rear wheels, based upon the sensed distances.

18 Claims, 6 Drawing Sheets

(56) References Cited

U.S. PATENT DOCUMENTS

| | | | |
|---|---|---|---|
| 2006/0282205 A1* | 12/2006 | Lange | A01B 69/008 |
| | | | 701/50 |
| 2011/0024218 A1* | 2/2011 | Grosjean | B62D 49/0607 |
| | | | 180/209 |
| 2011/0073026 A1* | 3/2011 | Martin | A01B 63/16 |
| | | | 111/130 |
| 2013/0325242 A1* | 12/2013 | Cavender-Bares | |
| | | | A01C 21/002 |
| | | | 701/25 |
| 2015/0334919 A1* | 11/2015 | Schleicher | A01B 69/008 |
| | | | 324/207.2 |
| 2015/0334920 A1* | 11/2015 | Schleicher | A01D 75/00 |
| | | | 701/41 |
| 2016/0318550 A1* | 11/2016 | Brooks | A01C 23/00 |
| 2018/0203458 A1* | 7/2018 | Zhang | A01G 9/14 |

* cited by examiner

CROP ROW SENSING ON VEHICLE WITH MULTIPLE, INDEPENDENTLY STEERABLE AXLES/WHEELS

FIELD OF THE DESCRIPTION

The present description relates to automatically controlling an agricultural vehicle. More specifically, the present description relates to generating steering control signals to automatically steer an agricultural vehicle that has multiple, independently steerable wheels or axles.

BACKGROUND

There are many different types of agricultural vehicles (or mobile machines) that are used to treat crops that are planted in rows (row crops). Some such vehicles are used to treat the crops, after they have been planted, and even after they have emerged.

Some row crops are planted in contoured rows or rows that are planted about a pivot circle. Still other row crops are planted on hillsides. In these types of scenarios, the operator of the agricultural vehicle often attempts to steer the front wheels in order to keep the front and rear wheels from running over the crop. This can be relatively difficult, depending upon the curvature of the rows or the steepness of side hills.

As one example, when an operator is operating an agricultural machine on a side hill, the rear of the machine often tends to shift or creep downward along the slope of the hill. The operator then often steers the front wheels up the hill slightly, in order to bias the machine in the uphill direction to keep the rear wheels between the rows. This is done in an attempt to avoid damaging the row crops with the rear wheels.

The discussion above is merely provided for general background information and is not intended to be used as an aid in determining the scope of the claimed subject matter.

SUMMARY

An agricultural machine has a set of front wheels and a set of rear wheels that are independently steerable relative to one another. Distance sensors are mounted to the agricultural vehicle to sense a distance between the front wheels, and the adjacent row crops, and between the rear wheels, and the adjacent row crops. Automatic steering control signals are generated to automatically steer the front wheels, and rear wheels, based upon the sensed distances.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
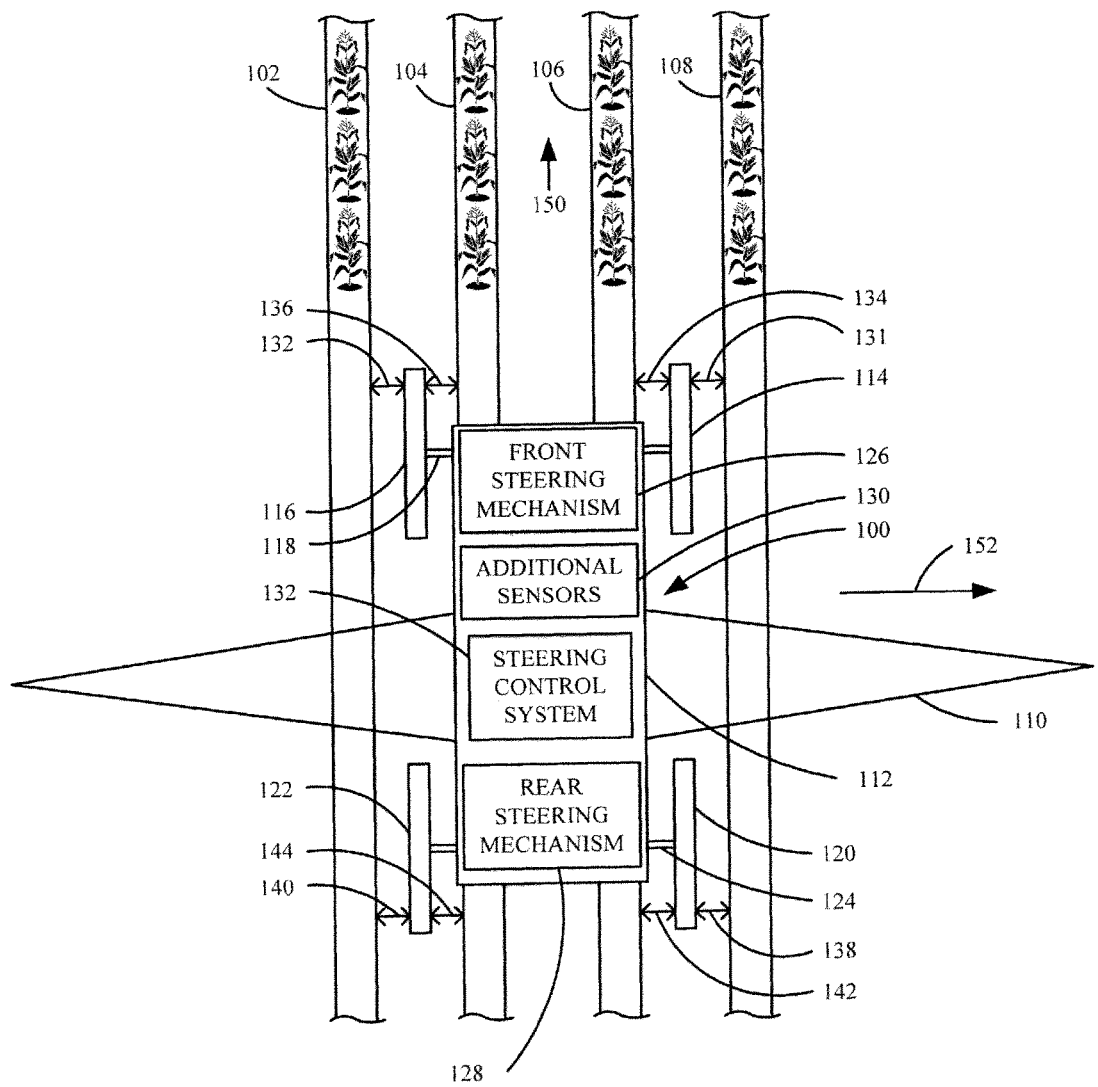
FIG. 1 is a partial pictorial diagram, partial block diagram, of an agricultural vehicle (or mobile machine) traveling in a field that has a row crop planted.

FIG. 1 is a partial block diagram, partial pictorial diagram illustrating one example of an agricultural mobile machine 100 traveling over rows 102-108 of crops in a field. In the example illustrated in FIG. 1, machine 100 is a sprayer with a boom 110 that may be fitted with nozzles for spraying a substance on the row crops in rows 102-108. FIG. 1 shows that, in one example, machine 100 includes a frame 112 with front wheels 114 and 116 steerably coupled to the frame 112 and supported by a front axle 118. It also includes rear wheels 120 and 122 steerably coupled to frame 112 and supported by a rear axle 124. It will be noted that the wheels can be other ground engaging traction mechanisms, such as tracks, but wheels are described herein by way of example only.

In one example, each of the individual wheels 114, 116, 120 and 122 are individually steerable, independently of one another. In such an example, each wheel may have a corresponding steering actuator (such as a hydraulic actuator) that can individually steer the corresponding wheel.

In another example, the front wheels 114 and 116 are steerable together, as a pair, and the rear wheels 120 and 122 are also steerable together, as a pair, but are steerable independently of the front wheels 114 and 116. Thus, the front pair of wheels can be steered together and the rear pair of wheels can be steered together, but independently of the front pair of wheels. In that example, the front pair of wheels has a steering actuator, and the rear pair of wheels has a separate steering actuator. The two steering actuators can be independently controlled.

FIG. 1 also shows that, in one example, machine 100 includes a set of front sensing mechanisms 126 and a set of rear sensing mechanisms 128, as well as a plurality of additional sensors 130, and a steering control system 132. Front sensing mechanisms 126 illustratively sense the distance of one or both front wheels 114 and 116 from an adjacent row. For instance, front sensing mechanisms 126 can sense the distance between wheel 114 and row 108, as indicated by arrow 131. They can also (or instead) sense the distance between wheel 116 and row 102, as indicated by arrow 132. They can also, or instead, sense the distance between wheel 114 and row 106, as indicated by arrow 134 and/or the distance between wheel 116 and row 104 as indicated by arrow 136. A number of different examples of sensing mechanisms that can be used as front sensing mechanism 126 are described in greater detail below.

Similarly, rear sensing mechanism 128 illustratively sense the distance between wheels 120 and 122 and adjacent rows. For instance, mechanisms 128 can sense the distance between wheel 120 and row 108 as indicated by arrow 138. They can also (or instead) sense the distance between wheel 122 and row 102 as indicated by arrow 140. Also, or instead, rear sensing mechanism 128 can sense the distance between wheel 120 and row 106, as indicated by arrow 142 and/or between wheel 122 and row 104 as indicated by arrow 144.

In one example, front sensing mechanism 126 can be a single sensor or multiple sensors that generate one or more sensor signals indicative of the sensed distances and that provide the sensor signals to steering control system 132. In addition, rear sensing mechanism 128 can be a single sensor or multiple sensors that illustratively generate one or more sensor signals indicative of the sensed distances and provide those sensor signals to steering control system 132.

Steering control system 132 can automatically generate or identify a steering angle for the front wheels 114 and 116, and a steering angle for the rear wheels 120 and 122. Where each of the wheels are independently steerable, steering control system 132 illustratively generates a steering angle for each wheel. Where front wheels 114 and 116 are steerable as a pair, it illustratively generates a steering angle corresponding to the pair. Similarly, where rear wheels 120 and 122 are steerable as a pair, control system 132 generates a steering angle for the pair of rear wheels as well. The steering angle is illustratively an angle at which the corresponding wheels should be steered, relative to the direction of travel (as indicated by arrow 150), or another reference, in order to keep wheels 114, 116, 120 and 122 between the rows of crop 102-108, to avoid running over any of the crop in the rows 102-108, and thus to avoid damaging the crop in the rows.

This can be helpful in a wide variety of different scenarios. For instance, assume that the field in which rows 102-108 are planted slopes downwardly to the right in the direction indicated by arrow 152. In some examples, this would tend to cause the rear wheels 120 and 122 of machine 100 to slide or creep downwardly in the direction of arrow 152, as machine 100 moves along in the direction of travel indicated by arrow 150. In that case, an operator would normally steer the front wheels 114-116 in the direction opposite of arrow 152 (or in the uphill direction) so that the rear wheels 120-122 do not run over the rows of crop. However, this can be very difficult. In addition, where the rows of crop are curved, it can be even more difficult to keep the wheels of machine 100 between the crop rows, especially where they are curved on a side hill.

Therefore, in accordance with one example, steering control system 132 receives the sensor signals that indicate how far the wheels of machine 100 are from the crop rows, and generates independent steering control signals to independently steer the front set of wheels and rear set of wheels (or to independently steer each individual wheel) to keep those wheels between the crop rows.

Sensors 130 can include a wide variety of additional sensors, such as a geographic position sensor, one or more orientation sensors that sense the orientation of machine 100, a boom roll angle sensor that senses a roll angle of boom 110, and a wide variety of other sensors. Sensors 130 illustratively generate corresponding sensor signals that sense the corresponding sensed variables and provide those sensor signals to steering control system 132 as well. These additional sensor signals can be used in order to determine when automated steering control should be initiated by steering control system 132. For instance, the sensor signals provided by sensors 130 may indicate when machine 100 is traveling on a side hill, when it is turning, when it is traveling uphill or downhill, etc. These signals may be used by control system 132 to initiate automated steering control and to control other items on machine 100.

Figure 2:
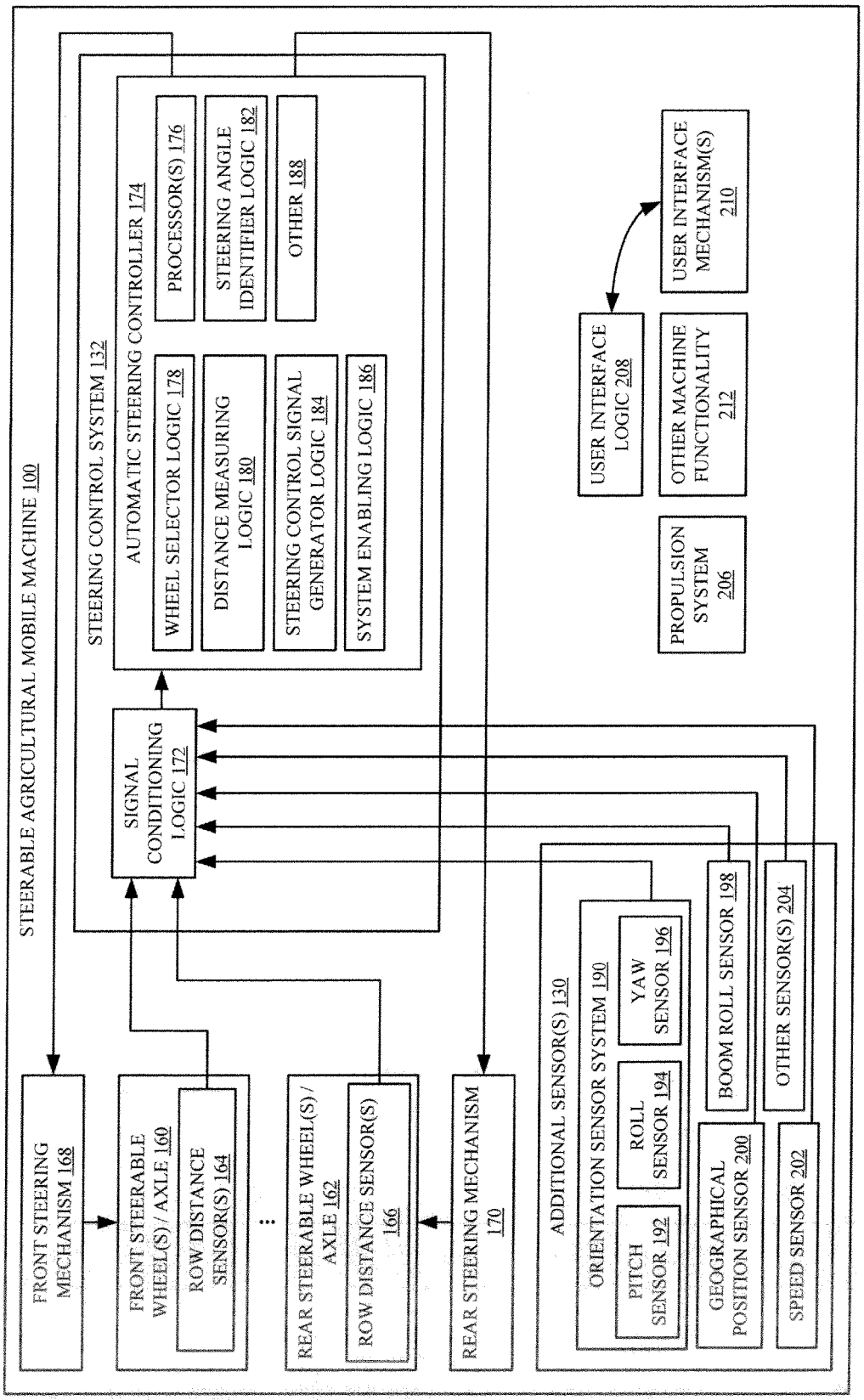
FIG. 2 is a block diagram of one example of some of the items on the agricultural mobile machine.

FIG. 2 is a block diagram showing one example of portions of steerable agricultural machine 100 in more detail. In the example shown in FIG. 2, the front set of steerable wheels 114-116 and axle 118 are all represented by the front steerable wheel/axle box 160. The rear wheels 120 and 122, and rear axle 124 are represented by the rear steerable wheel/axle box 162. The front sensing mechanisms 126 are represented by row distance sensors 164, and the rear sensing mechanisms 128 are represented by row distance sensors 166. Thus, row distance sensors 164 sense the distance between the wheels 114 and 116 and one or more adjacent crop rows. Row distance sensors 166 sense the distance between wheels 120 and 122 and one or more adjacent crop rows. Row distance sensors 164 may be two separate sensors separately mounted on wheels 114 and 116, or otherwise mounted in a position so that they can sense the desired distances. Row distance sensors 166 may be separate sensors mounted on wheels 120 and 122, or they can be mounted at another location to sense the desired distances. The row distance sensors 164 may be a single sensor, configured to sense the desired distances, and row distance sensors 166 may also be a single sensor, configured to sense the desired distances. All of these arrangements are contemplated herein. Some specific examples of the types of sensors that can be used are described in greater detail below.

The present description will proceed with respect to an example in which the front wheels 114 and 116 (represented by front steerable wheel(s)/axle 160 in FIG. 2) are steerable together as a pair and in which the rear steerable wheels 120 and 122 (represented by rear steerable wheel(s)/axle 162 in FIG. 2) are also steerable as a pair, independently of the front wheels. This is only one example. Thus, FIG. 2 also shows that each set of steerable wheel(s)/axle has a corresponding steering mechanism. For instance, the front steerable wheel (s)/axle 160 has a front steering mechanism 168 that can be used to steer the front steerable wheels or axle. The rear steerable wheel(s)/axle 162 have a corresponding rear steering mechanism 170 that can be used to steer the rear steerable wheels or axle. Steering control system 132 (which is also shown in more detail in FIG. 2) generates control signals that are provided to the front steering mechanism 168 and rear steering mechanism 170 to steer the front and rear wheels to keep the wheels between the crop rows.

Before describing the operation of machine 100 in more detail, a brief description of some items in machine 100, and their operation, will first be provided. FIG. 2 shows that steering control system 132 can include signal conditioning logic 172, and automatic steering controller 174. Automatic steering controller 174 can include one or more processors 176, wheel selector logic 178, distance measuring logic 180, steering angle identifier logic 182, steering control signal generator logic 184, system enabling logic 186, and it can include a wide variety of other items 188.

FIG. 2 also shows that, in one example, additional sensors 130 can include an orientation sensor system 190 that includes a pitch sensor 192, roll sensor 194, and yaw sensor 196. Pitch sensor 192 illustratively senses a pitch angle of machine 100. Roll sensor 194 illustratively senses a roll angle and yaw sensor 196 illustratively senses a yaw angle.

Also, in the example shown in FIG. 2, additional sensors 130 can include a boom roll sensor 198 that senses a boom roll angle of boom 110. Sensors 130 can include a geographical position sensor 200 (such as a GPS receiver or other geographical position sensor) that senses a geographic position of machine 100. Sensors 130 can include speed sensor 202 that senses a speed of machine 100 (such as a rotating speed of the axles or wheels, a ground travel speed, or another indication of machine speed), and it can include a wide variety of other sensors 204.

As shown in FIG. 2, machine 100 also illustratively includes propulsion system 206 that drives the travel of machine 100. Propulsion system 206, for instance, can include an engine and a transmission that drives rotation of wheels 114, 116, 120 and 122. As shown in FIG. 2, machine 100 can also include user interface logic 208 and user interface mechanisms 210, as well as a wide variety of other machine functionality 212. User interface mechanisms 210 can include output mechanisms, such as a display, a haptic output mechanism, an audio output mechanism, etc. It can also include input mechanisms, such as a touch sensitive display screen, pedals, a steering wheel, a joystick, buttons, levers, etc. The input mechanisms can also be mechanical linkages, electronic inputs, or a wide variety of other inputs. User interface logic 208 can be used to generate outputs on the output mechanisms, and to sense inputs on the input mechanisms.

Before automated steering control is performed, system enabling logic 186 can be used to enable or disable automated steering control. For instance, logic 186 can receive various sensor signals or other inputs and determine when automatic steering controller 174 should be conducting automatic steering control processing (such as generating the steering control signals). By way of example, system enabling logic 186 may sense a roll angle from roll sensor 194 or boom roll sensor 198 and determine whether machine 100 is traveling on a side hill based on the sensed angles. This can indicate whether automated steering control should be enabled. This is only one example.

When automated steering control is enabled, signal conditioning logic 172 illustratively receives the sensor signals from various sensors (such as row distance sensors 164 and 166 and additional sensors 130) and performs any desired signal conditioning. This can include amplification, linearization, normalization, and other signal conditioning. Wheel selector logic 178 may select one or more of the sensor signals that will be used to generate or otherwise identify a steering angle and a steering control signal. It will be appreciated that the sensor signals can be processed in parallel with one another as well, and selecting one or more signals for processing, sequentially, is only one example.

Distance measuring logic 180 generates a distance metric indicative of a distance represented by the selected sensor signal. For instance, the sensor signal may be an analog signal representative of the distance between the selected wheel or set of wheels and the corresponding crop row. Distance measuring logic 180 may illustratively generate a digital representation of that analog signal, which is, itself, representative of the distance. Steering angle identifier logic 182 illustratively identifies a steering angle corresponding to the selected wheel or set of wheels. The steering angle, in one example, is calculated as an angle relative to the direction of travel 150 (shown in FIG. 1), but it can be an angle that is relative to other reference points as well, such as relative to the center, elongate axis of machine 100 that lies in a direction running from the rear of the machine to the front of the machine, it can be relative to a central, elongate axis of the axle, or it can be relative to another reference point or reference line or line segment.

The steering angle can also be identified in a wide variety of different ways. For instance, the distance metric value that represents the sensed distance between wheel 114 and crop row 108 can be combined with a distance metric that represents the sensed distance between wheel 116 and crop row 102. For example, those two metrics can be subtracted from one another. The result of this combination will provide a value indicative of an offset of the set of wheels 114 and 116 in either direction (either toward crop row 108 or toward crop row 102). The steering angle can be generated from that offset to move the set of steerable wheels 114-116 closer to a center line between the two adjacent crop rows 102-104 and 106-108. It will be noted that the steering angle identifier logic 182 can identify the steering angle for the steerable wheel or set of wheels in a wide variety of other ways as well.

Once the steering angle has been identified for the selected wheel or set of wheels, steering control signal generator logic 184 illustratively generates a steering control signal that is provided to the corresponding steering mechanism 168 or 170 to steer the selected wheel or set of wheels according to the identified steering angle.

Figure 3:
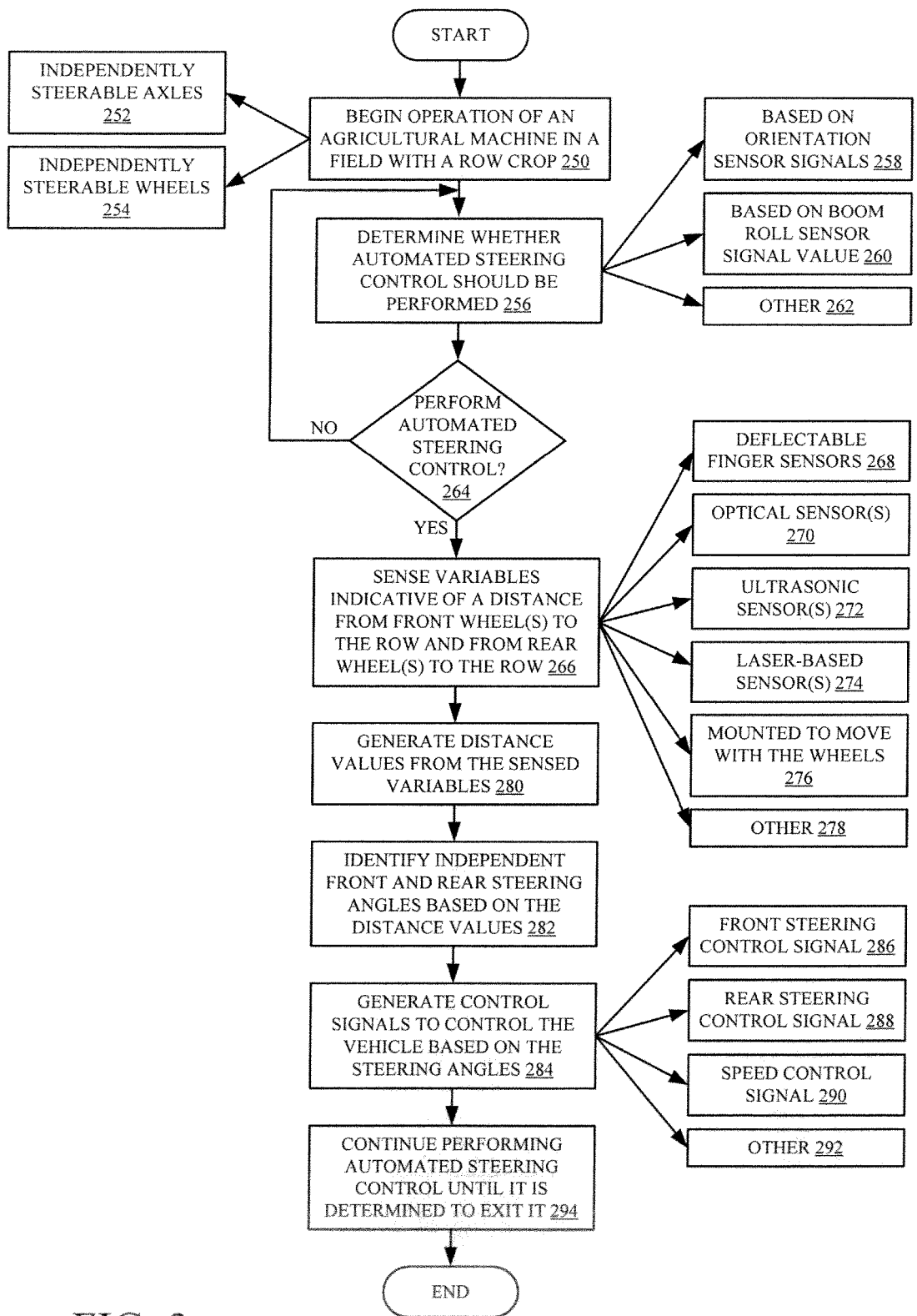
FIG. 3 is a flow diagram illustrating the operation of the agricultural mobile machine in sensing a distance between the wheels and the row crops, and automatically generating steering control signals.

FIG. 3 is a flow diagram illustrating one example of the operation of machine 100 in performing automated steering control. FIGS. 1-3 will now be described in conjunction with one another.

It is first assumed that machine 100 is operating in a field with a row crop. This is indicated by block 250 in the flow diagram of FIG. 3. In one example, machine 100 is traveling in the direction indicated by arrow 150. The machine may have independently steerable axles (so that the front and rear sets of wheels are independently steerable relative to one another. This is indicated by block 252. It may have independently steerable wheels (so that each wheel is independently steerable relative to the others). This is indicated by block 254.

System enabling logic 186 then determines whether automated steering control should be performed. This is indicated by block 256. This can be done based upon the sensor signals from the orientation sensors in orientation sensor system 190. This is indicated by block 258. It can be done based upon the boom roll sensor signal value from boom roll sensor 198. This is indicated by block 260. It can be performed based on a wide variety of other criteria as well, and this is indicated by block 262. For instance, it may be that the pitch sensor 192 generates a pitch signal indicating that machine 100 is beginning to travel uphill or downhill. It may be that the geographic position sensor 200 senses that machine 100 is in a geographic position which is on a side hill relative to the direction of travel. This can be determined by correlating the geographic position of machine 100 indicated by the geographic position sensor signal to a preexisting topographical map, that may be downloaded on machine 100 or that may be accessed at a remote computing system. It may be done in other ways as well. The yaw angle represented by the yaw sensor signal generated by yaw sensor 196 may identify a position of the rear of machine 100 relative to the front of the machine. This may give an indication that the rear of the machine is not directly aligned with (and tracking behind) the front of the machine (which may happen when the rear of the machine is creeping downhill as machine 100 travels across a side hill). Thus, the yaw sensor signal may be used by system enabling logic 186 to determine that vehicle 100 is on a side hill or other conditions exist under which automatic steering control should be performed. All of these and other scenarios are contemplated herein.

If automated steering control is not to be performed, then the normal operation simply continues and processing reverts to block 256. However, if it is determined that automated steering control is to be performed, then row distance sensors 164 and 166 sense variables indicative of a distance from the front wheels to an adjacent row and from the rear wheels to an adjacent row. This is indicated by block 266.

The row distance sensors 164 and 166 may take a wide variety of different forms. For instance, they may be deflectable finger sensors that contact the row crops and deflect in response to that contact. The amount of deflection is representative of the distance. When the deflectable fingers are closer to the row crop, they deflect at a greater angle (their deflection is greater) than when they are further away from the row crop. Thus, a sensor (such as a Hall Effect sensor or other sensor) can be used to generate a signal that is proportional to or representative of the amount of deflection of the deflectable fingers. The sensors being embodied by deflectable fingers or "row feelers" is indicated by block 268.

The row distance sensors 164 and 166 can also be optical sensors, or camera-based sensors. This is indicated by block 270. The optical sensors can be used to capture optical data indicative of the location of the rows relative to the wheels. For instance, images can be captured and image analysis can be performed to determine where a row is relative to the wheels. Other optical or camera-based sensors can detect the location of the rows as well.

The sensors can be ultrasonic sensors which are used to measure a distance to a row or another trackable feature on the field. This is indicated by block 272. The sensors can be laser-based sensors which sense the distance of the row from the wheels. This is indicated by block 274.

As briefly mentioned above, the sensors can be mounted in a variety of different places as well. When they are optical sensors, they may be mounted to a frame of machine 100. In that scenario, a single camera may be mounted on the front of the machine and a single camera may be mounted on the rear of the machine to detect the desired distances. When the sensors are deflectable fingers or other types of sensors, they may be mounted to (or closely proximate) the wheel or axle so that, if the wheel spacing is ever changed, the fingers move along with the wheels so that the distances between the wheels and the adjacent row crops can be accurately detected, regardless of wheel spacing. Mounting the sensors to the wheels is indicated by block 276. The sensors can be a wide variety of other types of sensors mounted in a wide variety of other ways as well, and this is indicated by block 278.

The sensor signals are then conditioned, if desired, and provided to distance measuring logic 180 which generates distance values from the sensed variables. This is indicated by block 280. The distance values are illustratively representative of the distances between the wheels and one or more of the adjacent rows.

Based upon these values, steering angle identifier logic 182 illustratively identifies independent front and rear steering angles at which the front and rear wheels should be steered, respectively, relative to a reference. This is indicated by block 282. For example, the distances between the left and right front wheels and the corresponding rows, may be combined (such as subtracted from one another) to obtain an offset value. This offset value will indicate whether the machine is tracking closer to one row than the other. The steering angle can be generated to move the vehicle back toward a more central position between the two rows. If the offset value is relatively large, then the steering angle may be larger. If the offset value is relatively small, then the steering angle may be small. Similarly, the steering angle may be identified based, at least in a part, on the speed of the machine 100. If the machine 100 is traveling at one speed, then the steering angle may be set to a higher or lower value than if the machine is traveling at another speed. All of these and other considerations for identifying the steering angle are contemplated herein.

Steering control signal generator logic 184 then generates control signals to control the vehicle based upon the steering angles identified. This is indicated by block 284. For instance, it illustratively generates a front steering control signal that is provided to front steering mechanism 168 in order to steer the front wheels (either individually or as a pair). Generating a front steering control signal is generated by block 286. It can also generate a rear steering control signal that is provided to rear steering mechanism 170 that is used to control steering of the rear wheels (either independently or as a pair). Generating a rear steering control signal is indicated by block 288.

Steering control signal generator logic 184 can also generate other control signals when performing automated steering control. For instance, it may generate a speed control signal 290 that is provided to propulsion system 206 to control the travel speed of the machine 100. Again, the speed of the machine 100 may be controlled to a higher or lower speed, based upon the particular steering control signals that are generated. The steering control signal generator logic 184 can generate a wide variety of other control signals as well. This is indicated by block 292.

Automatic steering controller 174 continues to perform automatic steering control until system enabling logic 186 determines that automatic steering control should be stopped. For instance, logic 186 may determine that machine 100 is no longer traveling on a side hill. Thus, the automatic steering control processing may be discontinued until it is enabled at a later time. Continuing to perform automatic steering control until logic 186 determines that it should not be continued is indicated by block 294. It will also be noted that, in one example, the operator can provide an input through a user interface mechanism 210 to disable automatic steering control or to enable it. All of these and other scenarios are contemplated herein.

It can thus be seen that the present description describes a system that can be used to maintain a desired distance between the wheels of a vehicle and the crop rows. It does this by independently controlling steering of the front and rear wheels, so that the front wheels stay between the rows, and so that rear wheels stay between the rows. This can be very helpful in a wide variety of scenarios, such as where the crop rows are curved, disposed on a side hill, or in other scenarios.

It will be appreciated that the present automated steering control can be used with other features of machine 100 as well. For instance, a tread adjustment feature may include one or more tread adjustment actuators that are mounted on machine 100 and controllably actuated to perform tread adjustment, such that the tread spacing for the wheels can be decreased or increased by actuating the actuators to move the front wheels inward toward one another or outward away from one another (respectively) relative to a center of machine 100. The same type of control can be provided for the rear wheels. The tread spacing control can be performed based on the distance measurements that measure distances between wheels and crop rows, and/or based on row spacing to maintain the wheel position in the center of the rows or adequately spaced from a desired row.

Figure 4:
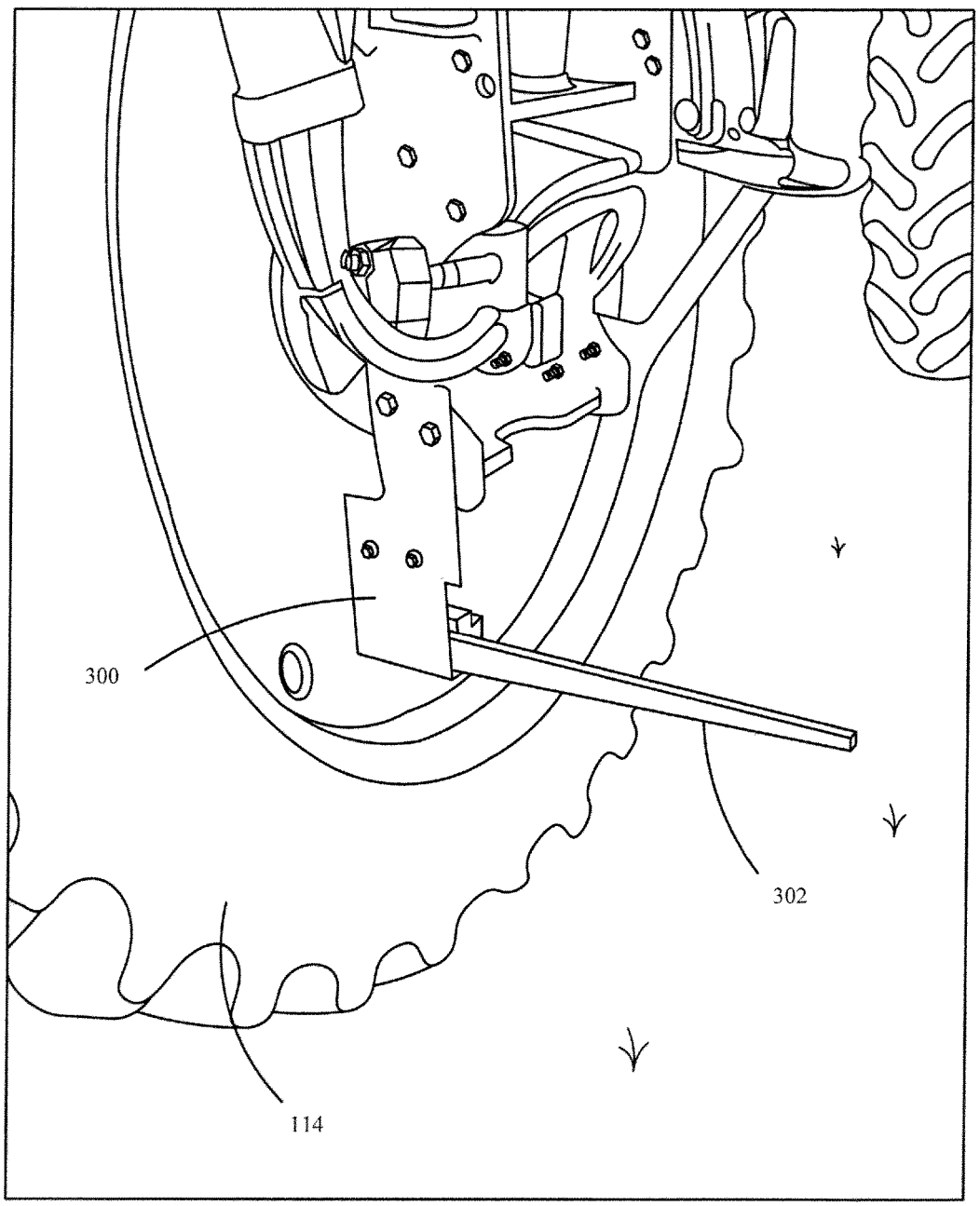
FIGS. 4-6 show examples of distance sensors.
Figure 5:
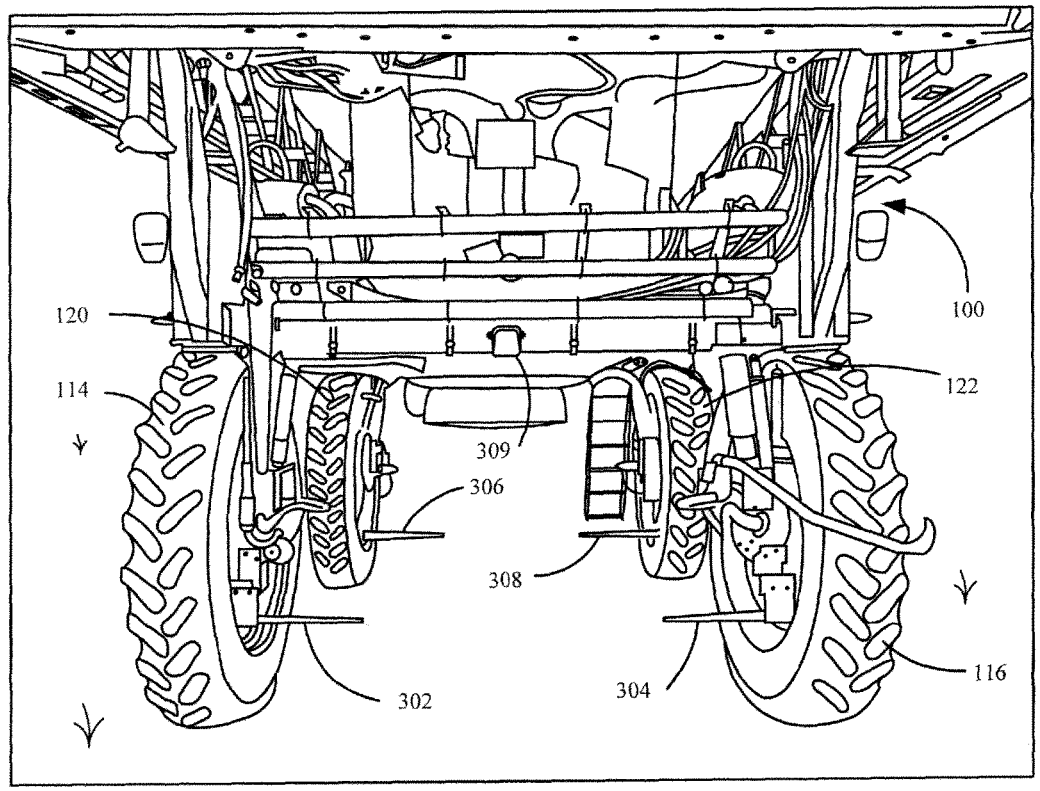
Figure 6:
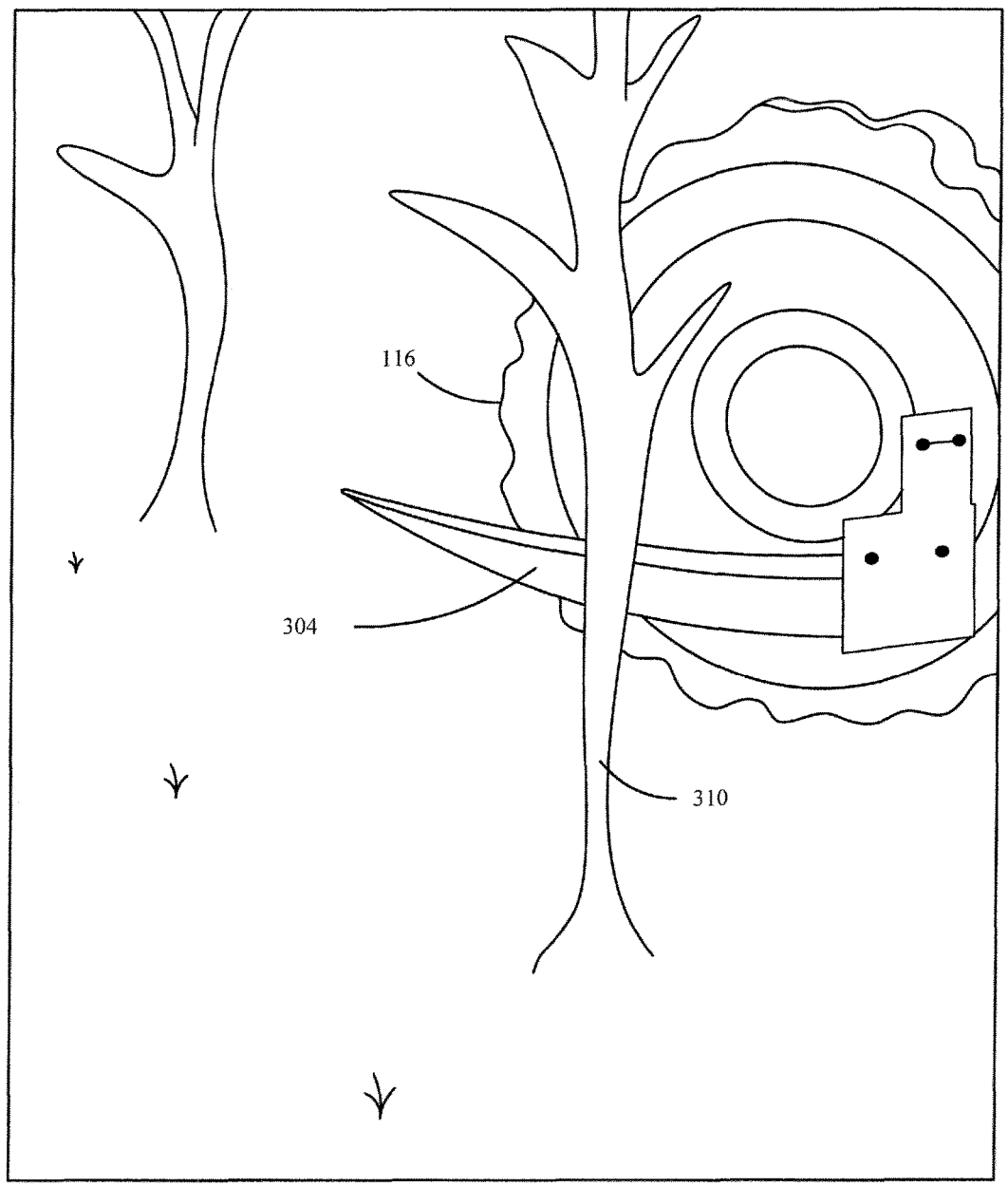

FIGS. 4-6 show some examples of the row distance sensors 164-166. FIG. 4 shows that wheel 114 is illustratively supported by an axle (not shown). A support mechanism 300 supports a deflectable finger 302 closely proximate to wheel 114. Deflectable finger 302 contacts the crop in row 104 (illustrated in FIG. 1) as machine 100 moves in the direction indicated by arrow 150. The degree (or amount) of deflection is representative of a distance of the inside of wheel 114 from the row crop being contacted. FIG. 5 is another illustration in which machine 100 is shown from a front view. FIG. 5 shows that an optical sensor (such as a camera) 309 can be mounted to the front of machine 100

(and another can be mounted to rear). With a wide enough field of view, the camera can capture an image that shows both front wheels (and the other camera can capture an image that shows both rear wheels). Image processing is performed to identify the desired distances between the wheels and adjacent crop rows.

Wheels 114 and 116 have deflectable fingers 302 and 304 disposed proximate their inner surfaces. Wheels 120 and 122 have deflectable fingers 306 and 308 disposed proximate their inner surfaces. Thus, as wheels 114 and 116 move closer to or further from rows 106 and 104, respectively, deflectable fingers 302 and 304 will deflect by an amount that is representative of the distance between the corresponding wheels and the adjacent rows. As wheels 120 and 122 move along the field, deflectable fingers 306 and 308 illustratively deflect to an extent that is indicative of the distance of those wheels to the adjacent rows.

FIG. 6 shows a more close-up view of wheel 116, with deflectable finger 304 actually deflecting in response to engagement with a plant 310 in a crop row. It can be seen that, the closer wheel 116 is to plant 310, the further deflectable finger 304 will deflect. Thus, the sensed degree (or amount) of deflection of finger 304 is indicative of the distance between the inside of wheel 116 and the plant 310.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It should also be noted that the different examples described herein can be combined in different ways. That is, parts of one or more examples can be combined with parts of one or more other examples. All of this is contemplated herein.

Example 1 is an agricultural mobile machine, comprising:
a frame;
a set of front ground engaging traction elements movably connected to the frame;
a first steering actuator controllable to steer the set of front ground engaging traction elements;
a set of rear ground engaging traction elements movably connected to the frame;
a second steering actuator controllable to steer the set of rear ground engaging traction elements independently of the set of front ground engaging traction elements;
a sensing component configured to sense a distance from each ground engaging traction element, in the set of front ground engaging traction elements, to an adjacent crop row and to sense a distance from each ground engaging traction element, in the set of rear ground engaging traction element, to an adjacent crop row; and
a steering control system that generates a first steering control signal to control the first steering actuator to steer the set of front ground engaging traction elements based on the sensed distance from each ground engaging traction element, in the set of front ground engaging traction elements, to adjacent crop rows, the steering control system generating a second steering control signal to control the second steering actuator to steer the set of rear ground engaging traction elements based on the sensed distance from each ground engaging traction element, in the set of rear ground engaging traction elements, to adjacent crop rows.

Example 2 is the agricultural mobile machine of any or all previous examples wherein the set of front ground engaging traction elements comprises a first front wheel and a second front wheel, the first steering actuator being controllable to steer the first and second front wheels as a pair, and wherein the set of rear ground engaging traction elements comprises a first rear wheel and a second rear wheel, the second steering actuator being controllable to steer the first and second rear wheels as a pair.

Example 3 is the agricultural mobile machine of any or all previous examples wherein the sensing component comprises:
a front wheel row distance sensing component configured to sense the distance from the first front wheel to a first crop row and from the second front wheel to a second crop row; and
a rear wheel row distance sensing component configured to sense the distance from the first rear wheel to the first crop row and from the second rear wheel to the second crop row.

Example 4 is the agricultural mobile machine of any or all previous examples wherein the front wheel row distance sensing component is configured to generate a first sensor signal indicative of the distance from the first front wheel to the first crop row and a second sensor signal indicative of the distance from the second front wheel to the second crop row.

Example 5 is the agricultural mobile machine of any or all previous examples wherein the steering control system comprises:
  steering angle identifier logic configured to identify a front wheel steering angle based on the first and second sensor signals, the steering control signal generator being configured to generate the first steering control signal based on the front wheel steering angle.

Example 6 is the agricultural mobile machine of any or all previous examples wherein the steering angle identifier logic is configured to combine the distance from the first front wheel to the first crop row with the distance from the second front wheel to the second crop row to obtain a front wheel offset value, the steering angle identifier logic being configured to identify the front wheel steering angle based on the front wheel offset value.

Example 7 is the agricultural mobile machine of any or all previous examples wherein the rear wheel row distance sensing component is configured to generate a third sensor signal indicative of the distance from the first rear wheel to the first crop row and a fourth sensor signal indicative of the distance from the second rear wheel to the second crop row.

Example 8 is the agricultural mobile machine of any or all previous examples wherein the steering control system comprises:
  steering angle identifier logic configured to identify a rear wheel steering angle based on the third and fourth sensor signals, the steering control signal generator being configured to generate the first steering control signal based on the rear wheel steering angle.

Example 9 is the agricultural mobile machine of any or all previous examples wherein the steering angle identifier logic is configured to combine the distance from the first rear wheel to the first crop row with the distance from the second rear wheel to the second crop row to obtain a rear wheel offset value, the steering angle identifier logic being configured to identify the rear wheel steering angle based on the rear wheel offset value.

Example 10 is the agricultural mobile machine of any or all previous examples and further comprising:
  an orientation sensor configured to sense an orientation of a portion of the agricultural mobile machine and generate an orientation signal indicative of the sensed orientation; and
  system enabling logic configured to generate an enabling signal to enable the steering control system to generate the first and second steering control signals to automatically control the first and second steering actuators based on the orientation signal.

Example 11 is the agricultural mobile machine of any or all previous examples wherein the front row distance sensing component comprises a first wheel distance sensor that senses the distance from the first front wheel to the first crop row and a second wheel distance sensor configured to sense the distance from the second front wheel to the second crop row and wherein the rear row distance sensing component comprises a third wheel distance sensor that senses the distance from the first rear wheel to the first crop row and a fourth wheel distance sensor configured to sense the distance from the second rear wheel to the second crop row.

Example 12 is the agricultural mobile machine of any or all previous examples wherein the first, second, third and fourth wheel distance sensors each comprise ultrasonic sensors.

Example 13 is the agricultural mobile machine of any or all previous examples wherein the front row distance sensing component comprises a first optical sensor configured to sense the distance from the first front wheel to the first crop row and to sense the distance from the second front wheel to the second crop row and wherein the rear row distance sensing component comprises a second optical element configured to sense the distance from the first rear wheel to the first crop row and to sense the distance from the second rear wheel to the second crop row.

Example 14 is an agricultural mobile machine, comprising:
  a set of front ground engaging traction elements steerably connected to a frame;
  a set of rear ground engaging traction elements steerably connected to the frame, the set of front ground engaging traction elements being independently steerable relative to the set of rear ground engaging traction elements;
  a sensing component configured to sense a distance from each ground engaging traction element, in the set of front ground engaging traction elements, to an adjacent crop row and to sense a distance from each ground engaging traction element, in the set of rear ground engaging traction element, to an adjacent crop row; and
  a steering control system that generates a first steering control signal to steer the set of front ground engaging traction elements based on the sensed distance from each ground engaging traction element, in the set of front ground engaging traction elements, to an adjacent crop row, the steering control system generating a second steering control signal to steer the set of rear ground engaging traction elements based on the sensed distance from each ground engaging traction element, in the set of rear ground engaging traction elements, to an adjacent crop row.

Example 15 is the agricultural mobile machine of any or all previous examples wherein the set of front ground engaging traction elements comprises a first front wheel and a second front wheel and wherein the set of rear ground engaging traction elements comprises a first rear wheel and a second rear wheel and wherein the sensing component comprises:
  a front wheel row distance sensing component configured to sense the distance from the first front wheel to a first crop row and from the second front wheel to a second crop row; and
  a rear wheel row distance sensing component configured to sense the distance from the first rear wheel to the first crop row and from the second rear wheel to the second crop row.

Example 16 is the agricultural mobile machine of any or all previous examples wherein the front wheel row distance sensing component is configured to generate a first sensor signal indicative of the distance from the first front wheel to the first crop row and a second sensor signal indicative of the distance from the second front wheel to the second crop row, and wherein the rear wheel row distance sensing component is configured to generate a third sensor signal indicative of the distance from the first rear wheel to the first crop row and a fourth sensor signal indicative of the distance from the second rear wheel to the second crop row.

Example 17 is the agricultural mobile machine of any or all previous examples wherein the steering angle identifier logic is configured to combine the distance from the first front wheel to the first crop row with the distance from the second front wheel to the second crop row to obtain a front wheel offset value, the steering angle identifier logic being configured to identify a front wheel steering angle based on the front wheel offset value and wherein the steering angle identifier logic is further configured to combine the distance from the first rear wheel to the first crop row with the distance from the second rear wheel to the second crop row to obtain a rear wheel offset value, the steering angle identifier logic being configured to identify a rear wheel steering angle based on the rear wheel offset value to.

Example 18 is a method of controlling an agricultural mobile machine, comprising:
sensing a distance from each front wheel, in a set of steerable front wheels, to an adjacent crop row;
sensing a distance from each rear wheel, in a set of steerable rear wheels, to an adjacent crop row;
generating a first steering control signal to steer the set of front wheels based on the sensed distance from each front wheel, in the set of front wheels, to an adjacent crop row; and
generating a second steering control signal to steer the set of rear wheels, independently of the set of front wheels, based on the sensed distance from each rear wheel, in the set of rear wheels, to an adjacent crop row.

Example 19 is the method of any or all previous examples wherein sensing a distance from each front wheel comprises sensing a distance from a first front wheel to a first crop row and from a second front wheel to a second crop row by generating a first sensor signal indicative of the distance from the first front wheel to the first crop row and a second sensor signal indicative of the distance from the second front wheel to the second crop row, and wherein sensing a distance from each rear wheel comprises sensing a distance from a first rear wheel to the first crop row and from a second rear wheel to the second crop row by generating a third sensor signal indicative of the distance from the first rear wheel to the first crop row and a fourth sensor signal indicative of the distance from the second rear wheel to the second crop row.

Example 20 is the method of any or all previous examples wherein generating the first steering control signal comprises combining the distance from the first front wheel to the first crop row with the distance from the second front wheel to the second crop row to obtain a front wheel offset value, and identifying a front wheel steering angle based on the front wheel offset value and wherein generating the second steering control signal comprises combining the distance from the first rear wheel to the first crop row with the distance from the second rear wheel to the second crop row to obtain a rear wheel offset value, and identifying a rear wheel steering angle based on the rear wheel offset value to.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An agricultural mobile machine, comprising: a frame; first and second front ground engaging traction elements movably connected to the frame; a front steering actuator controllable to steer the first and second front ground engaging traction elements; first and second rear ground engaging traction elements movably connected to the frame; a rear steering actuator controllable to steer the first and second rear ground engaging traction elements independently of the first and second front ground engaging traction elements; one or more sensors configured to: sense a first distance from one of the first or second rear ground engaging traction elements to a first crop row of a plurality of crop rows, wherein each crop row comprises a plurality of plants disposed in a row and is spaced apart from an adjacent crop row by a gap there between; sense a second distance from one of the first or second rear ground engaging traction elements to a second one of the crop rows; and sense a third distance from one of the front ground engaging traction elements to an adjacent crop row and to sense a fourth distance from one of the front ground engaging traction elements to an adjacent crop row; and a steering control system configured to: generate, based on the first and second distances, a rear steering control signal to control the rear steering actuator to steer the first and second rear ground engaging traction elements to maintain each of the first and second rear ground engaging traction elements in a gap between crop rows; and generate a front steering control signal to steer the set of front ground engaging traction elements based on the sensed third and fourth distances.

2. The agricultural mobile machine of claim 1 wherein the frame is configured to span over multiple crop rows.

3. The agricultural mobile machine of claim 1 wherein
the first and second front ground engaging traction elements comprise first and second front wheels,
the first and second rear ground engaging traction elements comprise first and second rear wheels,
the front steering actuator is controllable to steer the first and second front wheels as a pair, and
the rear steering actuator is controllable to steer the first and second rear wheels as a pair.

4. The agricultural mobile machine of claim 3 wherein the steering control system comprises: steering angle identifier logic configured to: combine the third distance with the fourth distance to obtain a front wheel offset value; and identify a front wheel steering angle based on the front wheel offset value; and the steering control signal generator is configured to generate the front steering control signal based on the front wheel steering angle.

5. The agricultural mobile machine of claim 2, wherein the frame supports a spraying system comprising spray nozzles configured to apply a spray of a substance to the crop rows as the agricultural mobile machine traverses the crop rows during a spraying operation.

6. The agricultural mobile machine of claim 3 wherein the one or more sensors comprise:
a rear wheel row distance sensor configured to generate a first sensor signal indicative of the first distance from the first rear wheel to the first crop row and a second sensor signal indicative of the second distance from the second rear wheel to the second crop row.

7. The agricultural mobile machine of claim 6 wherein the steering control system comprises:
steering angle identifier logic configured to identify a rear wheel steering angle based on the first and second sensor signals, the steering control signal generator being configured to generate the rear steering control signal based on the rear wheel steering angle.

8. The agricultural mobile machine of claim 7 wherein the steering angle identifier logic is configured to combine the first distance from the first rear wheel to the first crop row with the second distance from the second rear wheel to the second crop row to obtain a rear wheel offset value, the steering angle identifier logic being configured to identify the rear wheel steering angle based on the rear wheel offset value.

9. The agricultural mobile machine of claim 1 further comprising:
an orientation sensor configured to sense an orientation of a portion of the agricultural mobile machine and generate an orientation signal indicative of the sensed orientation; and
system enabling logic configured to generate an enabling signal to enable the steering control system to generate, based on the orientation signal, a front steering control signal to automatically control the front steering actuator and the rear steering control signal to automatically control the rear steering actuator.

10. The agricultural mobile machine of claim 3 wherein the one or more sensors comprise:
a first wheel distance sensor that senses the first distance from the first rear wheel to the first crop row;
a second wheel distance sensor configured to sense the second distance from the second rear wheel to the second crop row;
a third wheel distance sensor configured to sense the third distance from the first front wheel to the first crop row; and
a fourth wheel distance sensor configured to sense the fourth distance from the second front wheel to the second crop row.

11. The agricultural mobile machine of claim 10 wherein the first, second, third and fourth wheel distance sensors each comprise ultrasonic sensors.

12. The agricultural mobile machine of claim 3 wherein the one or more sensors comprise:
a first optical sensor configured to sense the first distance from the first rear wheel to the first crop row and to sense the second distance from the second rear wheel to the second crop row; and
a second optical sensor configured to sense the third distance from the first front wheel to the first crop row and to sense the fourth distance from the second front wheel to the second crop row.

13. An agricultural sprayer comprising: a frame supporting a spraying system comprising spray nozzles configured to apply a spray of a substance to crop rows as the agricultural sprayer traverses the crop rows during a spraying operation, each crop row comprising a plurality of plants disposed in a row and is spaced apart from an adjacent crop row; and the frame configured to span over a plurality of the crop rows during the spraying operation; a set of front ground engaging traction elements steerably connected to the frame; a set of rear ground engaging traction elements steerably connected to the frame, the set of front ground engaging traction elements being independently steerable relative to the set of rear ground engaging traction elements; one or more sensors configured to sense a first distance from one of the rear ground engaging traction elements to a first one of the crop rows and to sense a second distance from one of the rear ground engaging traction elements to a second one of the crop rows, and configured to sense a third distance from one of the front ground engaging traction elements to an adjacent crop row and to sense a fourth distance from one of the front ground engaging traction elements to an adjacent crop row; and a steering control system configured to generate a rear steering control signal to steer the set of rear ground engaging traction elements based on the sensed first and second distances, and to generate a front steering control signal to steer the set of front ground engaging traction elements based on the sensed third and fourth distances.

14. The agricultural sprayer of claim 13, wherein the set of front ground engaging traction elements comprises a first front wheel and a second front wheel and wherein the set of rear ground engaging traction elements comprises a first rear wheel and a second rear wheel and wherein the one or more sensors comprise: a rear wheel row distance sensor configured to sense the first distance from the first rear wheel to the first crop row and to sense the second distance from the second rear wheel to the second crop row; and a front wheel row distance sensor configured to sense the third distance from the first front wheel to the first crop row and to sense the fourth distance from the second front wheel to the second crop row.

15. The agricultural sprayer of claim 14 wherein
the steering angle identifier logic is configured to combine the third distance from the first front wheel to the first crop row with the fourth distance from the second front wheel to the second crop row to obtain a front wheel offset value,
the steering angle identifier logic is configured to identify a front wheel steering angle based on the front wheel offset value,
the steering angle identifier logic is configured to combine the first distance from the first rear wheel to the first crop row with the second distance from the second rear wheel to the second crop row to obtain a rear wheel offset value, and
the steering angle identifier logic is configured to identify a rear wheel steering angle based on the rear wheel offset value to.

16. A method of controlling an agricultural mobile machine, the method comprising:
sensing a first distance from a first front wheel, in a set of steerable front wheels, to a first crop row comprising a plurality of plants disposed in a first row;
sensing a second distance from a second front wheel, in a set of steerable front wheels, to a second crop row comprising a plurality of plants disposed in a second row that is spaced apart from the first row;
sensing a third distance from a first rear wheel, in a set of steerable rear wheels, to the first crop row;
sensing a fourth distance from a second rear wheel, in a set of steerable rear wheels, to the second crop row;
generating, based on the first and second distances, a first steering control signal to steer the set of front wheels to maintain each of the front wheels in a gap between crop rows; and
generating, based on the third and fourth distances, a second steering control signal to steer the set of rear wheels, independently of the set of front wheels, to maintain each of the rear wheels in a gap between crop rows.

17. The method of claim 16, comprising generating a first sensor signal indicative of the first distance from the first front wheel to the first crop row, generating a second sensor signal indicative of the second distance from the second front wheel to the second crop row, generating a third sensor signal indicative of the third distance from the first rear wheel to the first crop row, and generating a fourth sensor signal indicative of the distance from the second rear wheel to the second crop row.

18. The method of claim 17 wherein generating the first steering control signal comprises combining the distance from the first front wheel to the first crop row with the distance from the second front wheel to the second crop row to obtain a front wheel offset value, and identifying a front wheel steering angle based on the front wheel offset value and wherein generating the second steering control signal comprises combining the distance from the first rear wheel to the first crop row with the distance from the second rear wheel to the second crop row to obtain a rear wheel offset value, and identifying a rear wheel steering angle based on the rear wheel offset value to.

* * * * *